(12) United States Patent
Kwon et al.

(10) Patent No.: US 6,955,854 B2
(45) Date of Patent: *Oct. 18, 2005

(54) HIGH TENACITY POLYETHYLENE-2, 6-NAPHTHALATE FIBERS HAVING EXCELLENT PROCESSABILITY

(75) Inventors: Ik-Hyeon Kwon, Seoul (KR); Woo-Sung Kim, Ulsan Kwangyeok-si (KR); Yun-Hyuk Bang, Kyonggi-do (KR); Young-Jo Kim, Kyonggi-do (KR); Chan-Min Park, Ulsan Kwangyeok-si (KR)

(73) Assignee: Hyosung Corporation (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/763,543

(22) Filed: Jan. 23, 2004

(65) Prior Publication Data

US 2004/0265578 A1 Dec. 30, 2004

(30) Foreign Application Priority Data

Jun. 30, 2003 (KR) .............................. 10-2003-0043257

(51) Int. Cl.[7] .................................................. D01F 6/00
(52) U.S. Cl. ........................ 428/364; 428/372; 428/395
(58) Field of Search .............................. 428/364, 395, 428/372

(56) References Cited

U.S. PATENT DOCUMENTS

| 5,207,959 | A | 5/1993 | Antikow et al. | ............ 264/103 |
| 5,466,525 | A | 11/1995 | Maria et al. | ................. 428/357 |
| 5,931,211 | A | 8/1999 | Tamura | .................... 152/209.5 |
| 6,511,747 | B1 * | 1/2003 | Cho et al. | .................... 428/364 |

FOREIGN PATENT DOCUMENTS

| EP | 0 140 559 | 5/1985 |
| JP | 47-35318 | 11/1972 |
| JP | 48-64222 | 9/1973 |
| JP | 50-16739 | 2/1975 |
| JP | 62-143938 | 6/1987 |
| JP | 4-194021 | 7/1992 |

OTHER PUBLICATIONS

European Search Report; Application No. EP 04 00 1841; Date of Completion: Oct. 6, 2004.

* cited by examiner

*Primary Examiner*—N. Edwards
(74) *Attorney, Agent, or Firm*—Cantor Colburn LLP

(57) ABSTRACT

The present invention relates to a high tenacity polyethylene naphthalate fiber containing a silica compound. This fiber is produced by a method comprising the steps of: (A) melt-spinning a solid phase-polymerized polyethylene-2,6-naphthalate chip containing ethylene-2,6-naphthalate units at more than 85 mole % and a silica compound and having an intrinsic viscosity of 0.70–1.20, to produce a melt-spun yarn; (B) passing the melt-spun yarn through a retarded cooling zone and a cooling zone to solidify the yarn; (C) withdrawing the yarn at such a speed that the undrawn yarn has a birefringence of 0.001–0.1; and (D) subjecting the undrawn yarn to multi-stage drawing at a total draw ratio of at least 1.5 and a drawing temperature of 50–250° C. The polyethylene naphthalate fiber has improved physical properties, such as high tenacity, and a dipped cord produced from this fiber has excellent dimensional stability and tenacity such that it can be advantageously employed as a reinforcement material of rubber products.

13 Claims, 2 Drawing Sheets

HIGH TENACITY POLYETHYLENE-2, 6-NAPHTHALATE FIBERS HAVING EXCELLENT PROCESSABILITY

BACKGROUND OF THE INVENTION

1. Field of the Invention

The present invention relates to a high tenacity polyethylene naphthalate fiber with superior processability and drawability, which is produced from a polyethylene naphthalate polymer containing a silica compound. The fiber of the present invention provides a dipped cord having excellent dimensional stability and tenacity.

2. Background of the Related Art

A polyethylene naphthalate fiber having high tenacity, high thermal resistance and excellent dimensional stability is suitable for use as industrial yarns and rubber-reinforcing yarns in products such as tires, belts and hoses, and can exhibit optimal physical properties, particularly for tire cord applications. As the existing tire cord material, polyethylene terephthalate, nylon, rayon and aramid fibers, etc., were mainly used, but the rayon and aramid fibers cause environmental problems and require high production cost, and the polyethylene terephthalate and nylon fibers are relatively inferior in tenacity and dimensional stability at high temperature. On the other hand, a polyethylene naphthalate fiber, which is most frequently used as a reinforcement material of tires, can be produced in a similar equipment to a production equipment of the polyethylene terephthalate fiber and also has high tenacity and thermal resistance, and excellent dimensional stabilities such as high elasticity and low shrinkage, so that it is highly favorable for use as a fibrous reinforcement material of high value-added, high performance tires.

Polyethylene-2,6-naphthalates have higher glass transition temperature, crystallization temperature, melting temperature and melting viscosity, than polyethylene terephthalates, due to their bulky naphthalate units. Thus, to enhance their spinnability upon spinning, i.e., to reduce the melting viscosity of their melt upon spinning, they have been spun at a temperature relatively higher than the conventional spinning temperature (310 to 320° C.) of polyethylene terephthalates.

However, since the spinning at high temperature causes the thermal decomposition of the melt, resulting in a deterioration in drawing processability of the yarn and a significant reduction in intrinsic viscosity of the melt, it is difficult to produce a high strength yarn from polyethylene-2,6-naphthalate (see, Japanese patent laid-open publication Nos. Sho 47-35318, 48-64222 and 50-16739).

Japanese Patent No. 2945130 describes a method of producing polyethylene-2,6-naphthalate fibers with high strength and modulus by controlling the spinning speed and spinning draft ratio and changing the drawing temperature, instead of increasing the spinning temperature. Japanese patent laid-open publication No. Sho 62-143938 discloses a method for synthesizing a polyethylene naphthalate polymer, wherein a thermal stabilizer is used to prevent polyethylene naphthalate from thermal decomposition and thus to reduce the concentration of the carboxyl-terminal groups, such that a polyethylene naphthalate yarn produced from this polymer has high tenacity. However, such methods have a limitation in preventing the thermal decomposition of the polyethylene naphthalate, since the polyethylene naphthalate should be spun at a 10° C. higher temperature than polyethylene terephthalate due to its high melting temperature and viscosity. This thermal decomposition causes the contamination of a spinneret upon spinning and makes the fiber contains thermally decomposed materials, thereby adversely affecting the processability and thermal resistance of the resulting fiber.

Furthermore, upon stretching through a spinneret, the polyethylene naphthalate has a higher viscosity and 30–50° C. higher glass transition temperature than the polyethylene terephthalate and thus has inferior processability during spinning and drawing processes. However, such problems are not completely solved by the prior art.

Thus, the present inventors have conducted intensive studies to solve such problems, and consequently, found that when silica, which is mainly used as an additive for polyester films and was reported in use for the high-speed spinning of some polyesters, pluff reduction and an improvement in dyeing property, is added in the melt polymerization step of polyethylene naphthalate, the resulting polyethylene naphthalate has excellent spinnability upon melt-spinning even at low temperature, and when the spinning draft ratio and drawing temperature of the polymer are optimized based on this excellent spinnability, the physical properties of the resulting fiber can be improved. On the basis of this discovery, the present invention was perfected.

SUMMARY OF THE INVENTION

Accordingly, the present invention has been made to solve the above-mentioned problems occurring in the prior art, and an object of the present invention is to provide a high tenacity polyethylene naphthalate fiber having superior dimensional stability and strength that is useful for the production of tire cords, in which the polyethylene naphthalate fiber is produced by a method wherein silica is added in the melt polymerization step of producing polyethylene naphthalate to make the resulting polymer has excellent spinnability upon melt-spinning even at low temperature, and the spinning draft ratio and drawing temperature of the polymer is optimized based on this excellent spinnability.

To achieve the above object, in one embodiment, the present invention provides a polyethylene naphthalate fiber produced by a method comprising the steps of: (A) melt-spinning a solid phase-polymerized polyethylene-2,6-naphthalate chip containing ethylene-2,6-naphthalate units at more than 85 mole % and a silica compound and having an intrinsic viscosity of 0.70–1.20, to produce a melt-spun yarn; (B) passing the melt-spun yarn through a retarded cooling zone and a cooling zone to solidify the yarn; (C) withdrawing the yarn at such a speed that the undrawn yarn has a birefringence of 0.001–0.1; and (D) subjecting the undrawn yarn to multi-stage drawing at a total draw ratio of at least 1.5 and a drawing temperature of 50–250° C., wherein the polyethylene naphthalate fiber has the following physical properties: (1) an intrinsic viscosity of 0.60–1.10, (2) a tenacity of 8.0–11 g/d, (3) an elongation of 6.0–15%, (4) a birefringence of at least 0.35, (5) a density of 1.355–1.368, (6) a melting point of 267–280° C., and (7) a shrinkage of 1–5%.

In the polyethylene naphthalate fiber of the present invention, the silica compound is preferably fumed silica.

Also, the content of the silica compound is preferably 50–1,000 ppm.

Also, the content of the silica compound is more preferably 150–500 ppm.

Also, the silica compound preferably has an average particle size of 1–1,000 nm.

Also, the degree of crystal orientation of the polymer as measured by WAXS analysis is preferably decreased by the addition of the silica compound compared to the case where the silica compound is not added.

Also, the polyethylene naphthalate fiber preferably has a fineness of 500–3,000 deniers.

Also, a heating zone having an atmosphere temperature of 300–400° C. and a length of 300–500 mm is preferably placed just before and adjacent to the cooling zone in the step (B).

In another embodiment, the present invention provides a dipped cord produced by plying and cabling two strands of the polyethylene naphthalate fiber produced according to the above method and treating the cabled fiber with resorcinol-formalin-latex (RFL), wherein the dipped cord has the following physical properties: (a) a sum of elongation at 2.25 g/d load ($E_{2.25}$) and free shrinkage (FS) of less than 5.5%, and (b) a tenacity of at least 6.0 g/d.

Also, the dipped cord is preferably used as a reinforcement material of rubber products.

Also, the dipped cord preferably has a fineness of 1,000–8,000 deniers.

In still another embodiment, the present invention provides a pneumatic radial tire having an aspect ratio of less than 0.65, which comprises a pair of parallel bead cores, at least one radial carcass ply wound around the bead cores, a belt layer formed on the outer circumferential side of the carcass ply, a belt-reinforcing circumferential layer formed on the outer circumferential side of the belt layer, in which the carcass ply comprises the inventive dipped cord of the polyethylene naphthalate fiber containing the silica compound.

In the tire of the present invention, the carcass ply is preferably used in one or two layers.

Also, the reinforcement density of the dipped cord in the carcass ply is preferably 15–35 EPI.

Also, the dipped cord preferably has a twist number of 250–500 TPM.

Figure 1:
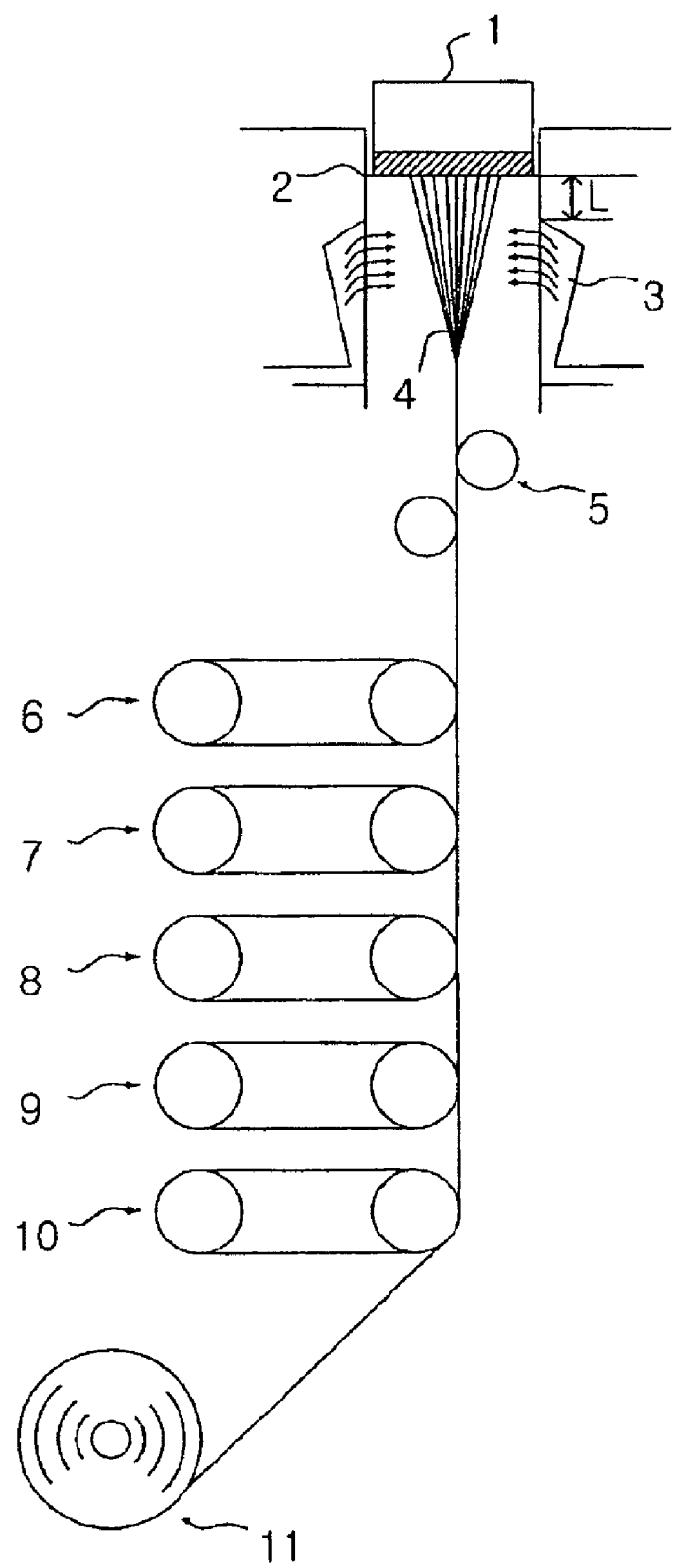
FIG. 1 schematically illustrates a process for producing a polyethylene naphthalate fiber of the present invention.

| | |
|---|---|
| 11: tire | 12: carcass layer |
| 13: carcass layer-reinforcing cord | 14: ply turn-up |
| 15: bead region | 16: bead core |
| 17: bead filler | 18: belt structure |
| 19: cap ply | 20: belt ply |
| 21, 22: belt cord | 23: tread |
| 24: edge ply | 25: cap ply cord |

DETAILED DESCRIPTION OF THE PREFERRED EMBODIMENT

Hereinafter, the present invention will be described in detail.

The polyethylene naphthalate chip which is used in the present invention contains at least 85 mol % of ethylene-2,6-naphthalate units. Preferably, the polyethylene-2,6-naphthalate polymer is composed essentially of polyethylene-2,6-naphthalate units.

Alternatively, the polyethylene-2,6-naphthalate may incorporate, as copolymer units, minor amounts of units derived from one or more ester-forming ingredients other than ethylene glycol and 2,6-naphthalene dicarboxylic acid or its derivatives. Examples of other ester-forming ingredients which may be copolymerized with the polyethylene terephthalate units include glycols such as 1,3-propanediol, 1,4-butanediol and 1,6-hexanediol, etc., and dicarboxylic acids such as terephthalic acid, isophthalic acid, hexahydroterephthalic acid, stilbene dicarboxylic acid, dibenzoic acid, adipic acid, sebacic acid and azelaic acid, etc.

The polyethylene naphthalate chip which is used in the present invention is preferably prepared by a method comprising the steps of: mixing a solid or melt of naphthalene-2,6-dimethylcarboxylate (NDC) is mixed with ethylene glycol in a weight ratio of 1.6–2.2 at 190° C. and optionally heating and dissolving the mixture; subjecting the mixture to transesterification at 180–230° C. under atmospheric pressure in the presence of a transesterification catalyst (e.g., Zn, Mn, Mg, Pb, Ca and Co), to produce bis-hydroxyethyl naphthalate or its oligomer having a polymerization degree of less than 10, the catalyst being used at the amount of 0.01–0.1 mole % relative to the mole of the naphthalene-2,6-dicarboxylate; adding a polymerization catalyst (e.g., Sb, Ti, Ge, Zn and Sn) and a phosphorus or phosphorous-based thermal stabilizer to the oligomer, the polymerization catalyst being added at the amount of 0.02–0.1 mole % relative to the mole of the naphthalene-2,6-dicarboxylate, the thermal stabilizer being added at the amount of 0.02–0.2 mole % relative to the mole of the naphthalene-2,6-dicarboxylate; and subjecting the resulting material to polycondensation at 250–300° C. under a low vacuum of 500–50 Torr and then a high vacuum of 10–0.1 Torr, thereby producing a polymer. In the transesterification or polycondensation step, a silica compound having an average particle size of 1–1,000 nm is added at the amount of 50–1,000 ppm.

The produced polymer is subjected to transesterification at 190–240° C. for about 2–4 hours and to polycondensation at 280–290° C. for about 2–3 hours, thereby producing a raw chip having an intrinsic viscosity of about 0.40–0.70. Then, the raw chip is subjected to solid phase polymerization at a temperature of 225–260° C. in vacuum to produce a solid phase-polymerized polymer having an intrinsic viscosity of 0.70–1.20 and a moisture content of less than 30 ppm.

As described above, the silica compound is added in the transesterification or polycondensation step at the amount of 50–1,000 ppm. If it is used at less than 50 ppm, its effect to improve the spinnability of the polymer will be insignificant since the amount of the silica compound is too low. If it is used at more than 1,000 ppm, an excess of the silica compound will act as a foreign substance to cause problems in spinning. The silica compound contained in the polymer has effects in that it acts to reduce the elongational viscosity of the polymer in a spinneret upon spinning, concentrates the stress of a drawn yarn and renders the drawn yarn lubricant, so that a maximum draw ratio at which an undrawn yarn is not broken is increased and the number of yarn breakages upon spinning is reduced, thereby increasing the processability of the yarn.

In the present invention, the silica compound preferably has an average particle size of 1–1,000 nm. If it is produced into a size smaller than 1 nm, it will have increased costs and thus will have reduced economic efficiency, and if it has a size larger than 1,000 nm, it will result in a reduction of spinnability of the polymer.

Furthermore, in the present invention, the content ratio between the transesterification catalyst Mn and the thermal stabilizer P, (Mn/P), is less than 2.0. If the Mn/P content ratio is more than 2.0, oxidation will be promoted during the solid phase polymerization, to deteriorate the physical properties of a spun yarn.

The polyethylene naphthalate chip thus obtained is spun into a fiber according to the method of the present invention. FIG. 1 schematically shows a producing process of a polyethylene naphthalate fiber according to one preferred embodiment of the present invention.

In the spinning step (A) of the present invention, the polyethylene naphthalate chip is melt-spun through a pack and nozzles at a relatively low temperature of 300–318° C. in order to prevent a reduction in viscosity of the polymer caused by thermal decomposition and hydrolysis.

In the present invention, in order to uniformly mix the polymer being spun and to increase the uniformity of the melting viscosity of the polymer, a unit such as a static mixer can be preferably placed above the pack.

In the solidifying step (B) of the present invention, the melt-spun yarn formed in the step (A) is solidified by passing it through a cooling zone. If necessary, a heating unit may be placed over a section from just below the nozzles to the start point of the cooling zone, i.e., hood length. This section is called the retarded cooling zone or the heating zone, and has a 300 to 500 mm length and is maintained at a temperature of 300 to 400° C. In the cooling zone 3, a quenching method which is selected from open quenching, circular closed quenching, radial outflow quenching and the like depending on a blowing method of cooling air can be applied. Then, the solidified yarn 4 from the cooling zone 3 may be oiled to 0.5–1.0% by an oil-feeding unit 5.

In the undrawn yarn-withdrawing step (C) of the present invention, the solidified yarn is withdrawn with a withdrawing roller in such a speed that the undrawn yarn has a birefringence of 0.001–0.1. A preferred speed at which the solidified yarn is withdrawn is 200–4,000 m/min. If the birefringence of the undrawn yarn is lower than 0.001, tension will not be applied to the undrawn yarn to make the yarn guide unstable such that the spun yarn becomes non-uniform. If the birefringence is higher than 0.1, the drawability of the undrawn yarn will be reduced to make subsequent drawing difficult, thereby lowering the tenacity of the yarn.

In the drawing step (D) of the present invention, the yarn passed through the withdrawing roller 6 is subjected to multi-stage drawing through a series of drawing rollers using either a separate drawing process or preferably a spin draw process, to produce a final drawn yarn. In this step, the temperature at the second drawing stage is controlled in the range of 100 to 210° C. More specifically, the undrawn yarn is predrawn to an extent of 1–10%, and then it is drawn to a first draw ratio of 1.2–7 at a temperature of 80–200° C. and a second draw ratio of 1.2–2.0 at a temperature of 130–200° C. In the first drawing stage, a steam-jet technique may be applied to increase the maximum draw ratio of the yarn. Then, the drawn yarn may be heat-set at a temperature of 200–260° C. and relaxed to an extent of 2–4%, in accordance with the conventional method.

The polyethylene naphthalate fiber produced by the method of the present invention has an intrinsic viscosity of 0.60–1.10, a tenacity of 8.0–11 g/d, an elongation of 6.0–15%, a birefringence of at least 0.35, a density of 1.355–1.368, a melting point of 267–280° C., and a shrinkage of 1–5%.

The drawn polyethylene naphthalate fiber produced by the inventive method may be converted into a dipped cord by the conventional process. For example, two strands of a 1500-denier drawn yarn are plied and cabled with 390 turns/m (the standard twist number for a general polyester dipped cord) to produce a cord yarn. Then, the cord yarn is dipped in a conventional adhesive solution (e.g., isocyanate, epoxy resin, parachlorophenol (PCP) resin and resorcinol-formaline-latex (RFL)), and dried and stretched at a temperature of 110–180° C. for 150–200 seconds at a stretch ratio of 1.0–4.0%. Then, the resulting cord yarn is heat-set and stretched at a temperature of 225–255° C. for 45–80 seconds at a stretch ratio of 2.0–6.0% in a hot stretching zone, and then, it is dipped again in a conventional adhesive solution (e.g., RFL), and dried at a temperature of 130–170° C. for 90–120 seconds. Then, the dried cord yarn is heat-set at a temperature of 225–255° C. for a period of 45 to 80 seconds at a stretch ratio of −4.0 to 2.0%, to obtain a dipped cord having a good dimensional stability, represented by the sum of $E_{2.25}$ (elongation at 2.25 g/d load) and FS (free shrinkage) being less than 5.5%, and a tenacity of at least 6.0 g/d.

Furthermore, the dipped cord produced by the present invention is used as a material for producing a carcass ply of pneumatic radial tires.

Figure 2:
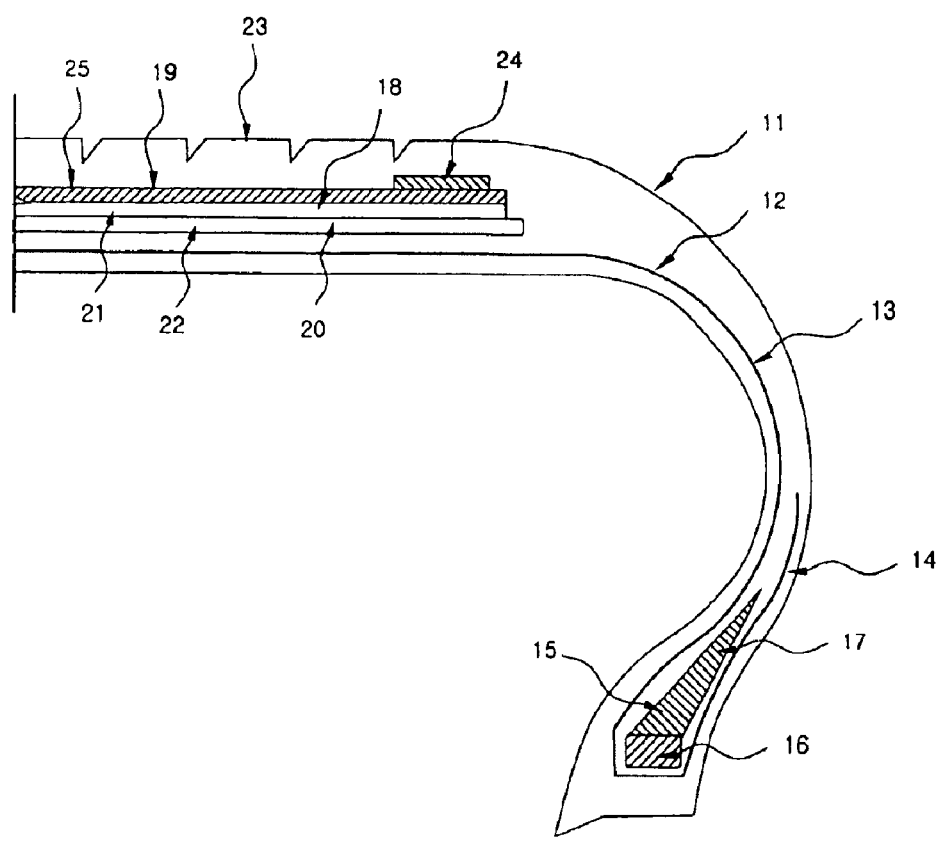
FIG. 2 schematically shows the structure of an automobile tire comprising high strength polyethylene naphthalate dipped tire according to the present invention.

Concretely, a cord as shown in FIG. 2 is produced. More concretely, a carcass cord 13 made of the dipped polyethylene naphthalate cord produced by the present invention has a total denier of 2,000 d–8,000 d. A carcass ply 12 comprises at least one layer of the tire cord 13 for carcass ply reinforcement. The reinforcement density of the dipped cord in the carcass ply is preferably 15–35 EPI. If the reinforcement density is lower than 15 EPI, the mechanical properties of the carcass ply will be lowered rapidly, whereas if it exceeds 35 EPI, disadvantages with respect to economic efficiency will be caused.

The carcass ply 12 with a radial direction outer ply turn-up 14 comprises carcass cords, preferably in one or two layers. The carcass cord 13 for reinforcement is oriented at an angle of 85–90° with respect to the circumferential direction of a tire 11. In the shown embodiment, the reinforcing carcass cord 13 is oriented at an angle of 90° with respect to the circumferential direction of the tire. The ply turn-up 14 preferably has a height of about 40–80% relative to the maximum section height of the tire. If the ply turn-up has a width of less than 40% relative to the maximum section width, its effect of supplementing the rigidity of tire sidewalls will be excessively reduced, whereas if it is higher than 80%, an excessive increase in rigidity of the tire sidewalls will be caused, resulting in an adverse effect on ride comfort.

A bead region 15 of the tire 11 has a non-expandable annular bead core 16. This bead core is preferably made of a continuously wound single-filament steel wire. In a preferred embodiment, a high-strength steel wire with a diameter of 0.95–1.00 mm is formed into a 4×4 structure or a 4×5 structure.

In a preferred embodiment of the present invention, the bead region has a bead filler 17. The bead filler needs to have a hardness higher than a certain level, and preferably a shore A hardness of more than 40.

In the present invention, the tire 11 is reinforced with a structure of a belt 18 and a cap ply 19 at its crown portion. The belt structure 18 comprises two cut belt plies 20. A cord 21 of the belt plies 20 is oriented at about 20° with respect to the circumferential direction of the tire. The cord 21 of the belt plies is disposed in the opposite direction to a cord 22 of another ply. However, the belt 18 may comprise an optional number of plies, and preferably can be disposed at an angle range of 16–24°. The belt 18 acts to provide lateral rigidity so as to minimize the rising of a tread 23 from the road surface during the running of the tire. The cords 21 and 22 of the belt 18 are made of steel cords in a 2+2 structure, but may also have other structures. The upper portion of the belt 18 is reinforced with a cap ply 21 and an edge ply 24. A cap ply cord 25 within the cap ply 19 is disposed in the parallel direction to the circumferential direction of the tire and serves to inhibit a change in size by high-speed running of the tire. Also the cap ply cord 25 is made of a material having high shrinkage stress at high temperature. Although one layer of the cap ply 19 and one layer of the edge ply 21 may be used, one or two layer of the cap ply and one or two layers of the edge ply are preferably used.

As described above, the present invention provides the high tenacity polyethylene naphthalate fiber having improved physical properties, which is produced by the method wherein the silica compound is added in the melt polymerization step of producing the polyethylene naphthalate polymer to make the resulting polymer has excellent spinnability upon melt spinning even at low temperature, and the spinning draft ratio and drawing temperature of the polymer is optimized based on this excellent spinnability. Particularly, the dipped cord produced from the high tenacity polyethylene naphthalate fiber of the present invention has excellent dimensional stability and high tenacity, so that it can be advantageously employed as a reinforcement material of rubber products such as tires and belts.

The following Examples are given for the purpose of illustration only, and are not intended to limit the scope of the invention. In the Examples and Comparative Examples, the characteristics of the yarns produced were evaluated in accordance with the following methods.

(1) Intrinsic Viscosity(I.V.)

0.1 g of a sample was dissolved in a mixture of phenol and 1,1,2,2-tetrachloroethane(60/40 by weight) to a concentration of 0.4 g/100 ml. The solution was put in Ubbelohde viscometer and kept in a 30° C. water bath for 10 minutes. The flow time of the solution as well as that of the solvent were measured and RV and IV values were calculated based on the following formulae:

$$R.V. = \text{flow time of the solution/flow time of the solvent} \quad (1)$$

$$I.V. = \tfrac{1}{4} \times (R.V.-1)/C + \tfrac{3}{4} \times (\ln R.V./C) \quad (2)$$

Wherein, C is the sample concentration(g/100 ml).

(2) Tenacity and elongation

The tenacity and elongation of a sample was determined in accordance with ASTM D 885 at a sample length of 250 mm, a tensile speed of 300 mm/min. and 80 turns/m under a standard atmosphere(20° C., 65% relative humidity), using Instron 5565 (Instron Co., Ltd, USA).

(3) Density

The density ($\rho$) of a sample was determined using a xylene/carbon tetrachloride density gradient column at 23° C. The gradient column was prepared and calibrated according to ASTM D 1505 at a density range of 1.34 to 1.41 g/cm$^3$.

(4) Shrinkage

A sample was kept under a standard atmosphere (20° C., 65% relative humidity) for 24 hours and then its length ($L_0$) at 0.1 g/d load was measured. Alternatively, a sample was kept in a dry oven of 150° C. under a non-tension condition for 30 minutes and left outdoors for 4 hours, and then its length(L) at 0.1 g/d load was measured. Shrinkage(%) was calculated from the following formula:

$$\Delta S(\%) = (L_0 - L)/L_0 \times 100 \quad (3)$$

(5) Elongation at Specific Load

As an elongation at specific load, the elongation at 4.5 g/d load was measured on the S-S tenacity and elongation curve for and original yarn sample, and the elongation at 2.25 g/d load, for a dipped cord sample.

(6) Dimensional Stability

The dimensional stability(%) of a dipped cord, which is related to the tire sidewall indentations(SWI) and tire handling properties, is determined by the modulus at a given shrinkage, and the sum $E_{2.25}$ (elongation at 2.25 g/d load)+ FS(free shrinkage) is a good indicator of the dimensional stability for a dipped cord processed under a particular heat-treatment condition, and the lower the sum, the better the dimensional stability.

(7) Birefringence

The birefringence of a sample was determined using a polarizing light microscope equipped with a Berek compensator.

(8) Melting Point

A sample was powdered, and 2 mg of the sample powder was put in a pan and sealed. Then, the sample was heated at a rate of 20° C. per 1 minute from room temperature to 290° C. using Perkin-Elmer DSC 7 under a nitrogen atmosphere and the temperature at the maximum heat-absorption peak was set as the melting point.

(9) Number of Yarn Breakages Per Day

The number of yarn breakages was calculated according to the following equation (4):

$$\text{Number of yarn breakages/(day} \times \text{position)} \quad (4)$$

EXAMPLE 1

Naphthalate-2,6-dimethylcarboxylate was subjected to transesterification at a temperature of 190–240° C. in the presence of Mn as a transesterification catalyst and then subjected to polycondensation at a temperature of 240–290° C. in the presence of Sb as a polymerization catalyst and P as a thermal stabilizer. In this melt polymerization step, fumed silica particles with an average particle size of 10 nm were added such an amount that the resulting polymer contains 300 ppm of the fumed silica. Also, the transesterification catalyst was used at the amount of 0.2 mole % relative to the mole of the naphthalene-2,6-dicarboxylate, the polymerization catalyst was used at the amount of 0.03 mole % relative to the mole of the naphthalene-2,6-dicarboxylate, and the thermal stabilizer was used at 0.02 mole %.

The produced polymer was subjected to solid phase polymerization to produce a solid phase-polymerized polyethylene naphthalate chip having an intrinsic viscosity (I.V.) of 1.0 and a moisture content of 20 ppm. The produced chip was melt-spun through an extruder at 316° C. and a discharge rate of 440 g/min. At this time, the polymer being melt-spun was mixed uniformly in a polymer transporting pipe using a static mixer composed of five units. Then, the spun yarn was solidified by passing successively it through a 40 cm-long heating zone of a 370° C. atmosphere temperature located just below the nozzles, and a 530 mm-long cooling zone in which a cooling air of 20° C. was blown at a rate of 0.5 m/sec. The solidified yarn was oiled and withdrawn at a rate of 380 m/min to form an undrawn yarn, which was predrawn to the extent of 5%, and then, drawn in two stages. The first stage drawing was performed at a draw ratio of 5.15 at 150° C., and the second stage drawing, at a draw ratio of 1.2 at 170° C. Then, the drawn yarn was heat-set at 230° C., relaxed to 3% and wound to form a 1,500 denier final drawn yarn.

The properties of the drawn yarn thus obtained were measured and the results are given in Table 1.

EXAMPLES 2 AND 3 AND COMPARATIVE EXAMPLES 1 TO 5

Drawn yarns were produced in the same manner as in Example 1 except that the particle size and content of the silica, and the draw ratio of the yarn, were changed as given in Table 1.

The properties of the drawn yarn thus obtained were measured and the results are given in Table 1.

height of the tire. The bead portion 15 had the bead core 16 made of a high strength steel wire with a 0.95–1.00 mm diameter in a 4×4 structure, and the bead filler 17 with a shore A hardness of more than 40. The upper portion of the belt 18 was reinforced with a belt-reinforcing layer consisting of one layer of the cap ply 19 and one layer of the edge ply 24. A cap ply cord in the cap ply 19 was disposed parallel to the circumferential direction of the tire.

COMPARATIVE EXAMPLE 6

A tire was manufactured in the same manner as in Example 4 except that the drawn polyethylene naphthalate

TABLE 1

| | | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|
| Viscosity and composition | Limit viscosity of chip | 1.0 | 1.0 | 1.0 | 1.0 | 1.0 | 1.0 | 1.0 | 1.0 |
| | Particle size of $SiO_2$ (nm) | 10 | 10 | 50 | | | 10 | 10 | |
| | Content of $SiO_2$ (ppm) | 300 | 700 | 300 | | | 20 | 1200 | |
| | Content of $TiO_2$ (ppm) | | | | | | | | 300 |
| Spinning condition and physical properties | Maximum draw ratio | 6.5 | 6.6 | 6.5 | 6.2 | 6.2 | 6.2 | 6.4 | 6.1 |
| | Total draw ratio | 6.0 | 6.0 | 6.0 | 5.8 | 6.0 | 6.0 | 6.0 | 5.7 |
| | Tenacity (g/d) | 10.0 | 9.9 | 9.8 | 9.8 | | | 9.7 | 9.8 |
| | Elongation (%) | 10.2 | 10.3 | 10.3 | 9.8 | | | 9.4 | 8.9 |
| | Number of Yarn breakage (Number/dayxpos) | Less than 1 | Less than 1 | Less than 1 | 2.5 | Process was impossible | Process was impossible | At least 5 | 3.5 |
| | Birefringence of undrawn yarn | 0.006 | 0.005 | 0.006 | 0.007 | | | 0.005 | 0.007 |
| | Melting point of drawn yarn | 273 | 272 | 272 | 274 | | | 274 | 274 |
| | Density of drawn yarn | 1.363 | 1.364 | 1.362 | 1.357 | | | 1.360 | 1.360 |
| | Fineness(d) | 1500 | 1500 | 1500 | 1500 | | | 1500 | 1500 |

As shown in Table 1, Comparative Examples 1 and 2 containing no silica and Comparative Examples 3 and 4 containing the silica compound at an amount out of a suitable range did not show stable processability under conditions with a such excellent physical properties as in Examples. Moreover, Comparative Example 5 containing titanium dioxide, which is generally used in the spinning of polyester fibers, also showed insignificant effects. The maximum draw ratio in Table 1 means a draw ratio above which the yarn is broken upon its drawing.

EXAMPLE 4

Two strands of the drawn yarn produced by Example 1 were plied and cabled with 390 turns/m to produce a cord yarn. The cord yarn was dipped in an adhesive solution of parachlorophenol (PCP) resin and RFL in a dipping tank, dried and stretched at 170° C. for 150 seconds at a stretch ratio of 1.0% in a drying zone, heat-set at 240° C. for 150 seconds in a hot stretching zone, dipped in RFL, dried at 170° C. for 100 seconds, and then, heat-set at 240° C. for 40 seconds at a stretch ratio of −1.0%, to obtain a dipped cord. A radial tire which was manufactured using the dipped polyethylene naphthalate cord had a carcass layer which has a ply turn-up extending radially outward therefrom and comprises one layer of the dipped polyethylene naphthalate cord. This carcass cord had a specification given in Table 2 below, and was oriented at an angle of 90° with respect to the circumferential direction of the tire. The ply turn-up 14 had a height of 40–80% relative to the maximum section yarn containing no silica compound, which had been produced by Comparative Example 1, was used.

COMPARATIVE EXAMPLE 7

A tire was manufactured in the same manner as in Example 4 except that the drawn polyethylene naphthalate yarn containing titanium dioxide, which had been produced by Comparative Example 5, was used.

215/60 R15 V tires manufactured in Example 4 and Comparative Examples 6 and 7 were mounted on 2000 cc cars and tested at 60 km/h, while noise occurring in the cars was measured and noise in the audio frequency range was expressed in dB. Handling stability and ride comfort were rated at intervals of 5 points of 100 by skilled drivers after running a predetermined course, and the results are given in Table 2 below. Furthermore, the endurance of the tires was measured according to a P-metric tire endurance test by running the tires at 38±3° C., and 85%, 90% and 100% of a load marked on tires, and a speed of 80 km/h, for 34 hours. In this endurance measurement, if bead separation, cord cutting, belt separation and the like could not found in any of portions, including treads, sidewalls, carcass cords, inner liners, and beads, etc., the tire was evaluated as "OK".

TABLE 2

|  |  | Ex. 4 | Comp. Ex. 6 | Comp. Ex. 7 |
|---|---|---|---|---|
| Carcass | Material | PEN | PEN | PEN |
|  | Specification (d/twist yarn) | 1500d/2 | 1500d/2 | 1500d/2 |
|  | EPI (ends/in) | 24 | 25 | 25 |
|  | Strength (kg) | 26 | 24 | 23 |
|  | Elastic coefficient (g/d) | 90 | 89 | 88 |
| Cap ply | Material | Nylon | Nylon | Nylon |
|  | Specification (d/twist yarn) | 1260d/2 | 1260d/2 | 1260d/2 |
|  | Strength (kg) | 24 | 24 | 24 |
|  | Elastic coefficient (g/d) | 30 | 30 | 30 |
| Tire | Aspect ratio | 0.60 | 0.60 | 0.60 |
|  | Number of carcass layers | 1 | 1 | 1 |
|  | Number of cap ply layers | 1 | 1 | 1 |
|  | Weight of tire (kg) | 9.83 | 9.94 | 10.01 |
|  | Ride comfort | 100 | 91 | 94 |
|  | Handling stability | 100 | 94 | 94 |
|  | Endurance | OK | OK | OK |
|  | Uniformity | 100 | 94 | 96 |
|  | Noise (dB) | 61.4 | 64.5 | 63.2 |

From the test results in Table 2, it can be found that the inventive tire which used polyethylene naphthalate fibers containing silica (Example 4) has a lower weight than the tires of Comparative Examples 6 and 7 having a PEN cord at their carcass, such that its rotation resistance can be reduced. Moreover, it can be found that the inventive tire whose carcass comprises the PEN cord produced by the present invention has excellent ride comfort and handling stability, reduced noise, and improved uniformity.

As described above, according to the present invention, the silica compound is added in the melt polymerization step to produce the polymer having excellent spinnability. Thus, the polyethylene naphthalate fiber produced from this polymer has improved physical properties, such as high tenacity. Moreover, the dipped cord produced from this yarn has excellent dimensional stability and tenacity such that it can be advantageously employed as a reinforcement material of rubber products, such as tires and belts, or in other industrial applications. The polyethylene-2,6-naphthalate fiber produced by the inventive method is suitable for various applications requiring high tensile strength, tensile strain resistance and high thermal resistance, while it has excellent processability so that it shows a reduced number of yarn breakages even in long-term spinning.

What is claimed is:

1. A polyethylene naphthalate fiber produced by a method comprising the steps of:
    (A) melt-spinning a solid phase-polymerized polyethylene-2,6-naphthalate chip containing ethylene-2,6-naphthalate units at more than 85 mole % and a silica compound and having an intrinsic viscosity of 0.70–1.20, to produce a melt-spun yarn;
    (B) passing the melt-spun yarn through a retarded cooling zone and a cooling zone to solidify the yarn;
    (C) withdrawing the yarn at such a speed that the undrawn yarn has a birefringence of 0.001–0.1; and
    (D) subjecting the undrawn yarn to multi-stage drawing at a total draw ratio of at least 1.5 and a drawing temperature of 50–250 C; and wherein the polyethylene naphthalate fiber having some properties of (1) an intrinsic viscosity of 0.60–1.10. (2) a tenacity of 8.0–11 g/d, (3) an elongation of 6.0–15%, (4) a birefringence of at least 0.35, (5) a density of 1.355–1.368, (6) a melting point of 267–280 C, and (7) a shrinkage of 1–5%.

2. The polyethylene naphthalate fiber of claim 1, which has a fineness of 500 to 3,000 denier.

3. The polyethylene naphthalate fiber of claim 1, wherein the silica compound is fumed silica.

4. The polyethylene naphthalate fiber of claim 1, wherein the content of the silica compound is 50–1,000 ppm.

5. The polyethylene naphthalate fiber of claim 1, wherein the content of the silica compound is 150–500 ppm.

6. The polyethylene naphthalate fiber of claim 1, wherein the silica compound has an average particle size of 1–1,000 nmn.

7. The polyethylene naphthalate fiber of claim 1, wherein the degree of crystal orientation of the polymer as measured by WAXS analysis is decreased by the addition of the silica compound compared to the case where the silica compound is not added.

8. The polyethylene naphthalate fiber of claim 1, wherein the heating zone having an atmosphere temperature of 300–400° C. is placed just before and adjacent to the cooling zone in the step (B).

9. The polyethylene naphthalate fiber of claim 1, wherein the heating zone having a length of 300–500 mm is placed just before and adjacent to the cooling zone in the step (B).

10. The polyethylene naphthalate fiber of claim 3, wherein the content of the silica compound is 50–1,000 ppm.

11. The polyethylene naphthalate fiber of claim 3, wherein the content of the silica compound is 150–500 ppm.

12. The polyethylene naphthalate fiber of claim 3, wherein the silica compound has an average particle size of 1–1,000 nm.

13. The polyethylene naphthalate fiber of claim 3, wherein the degree of crystal orientation of the polymer as measured by WAXS analysis is decreased by the addition of the silica compound compared to the case where the silica compound is not added.

* * * * *